UNITED STATES PATENT OFFICE.

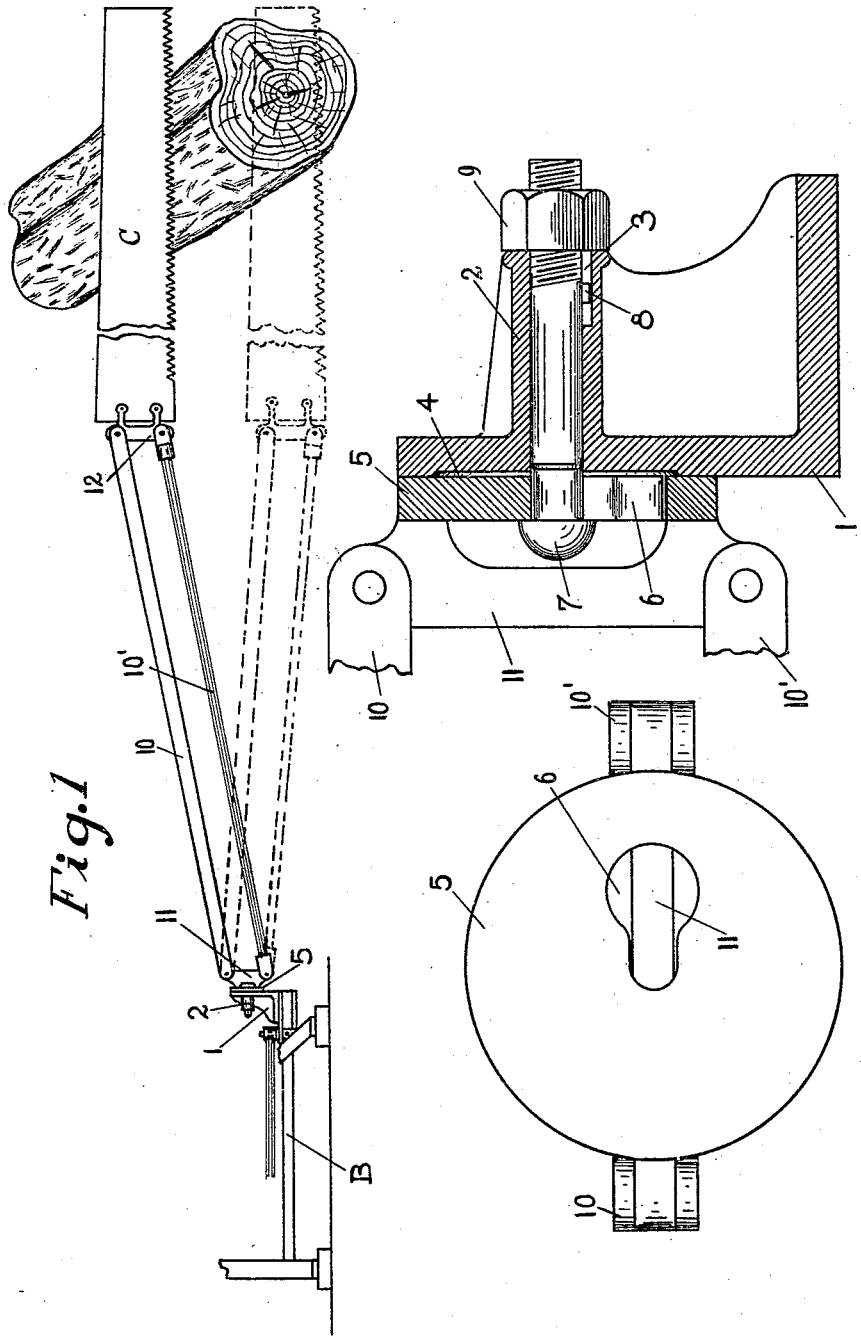

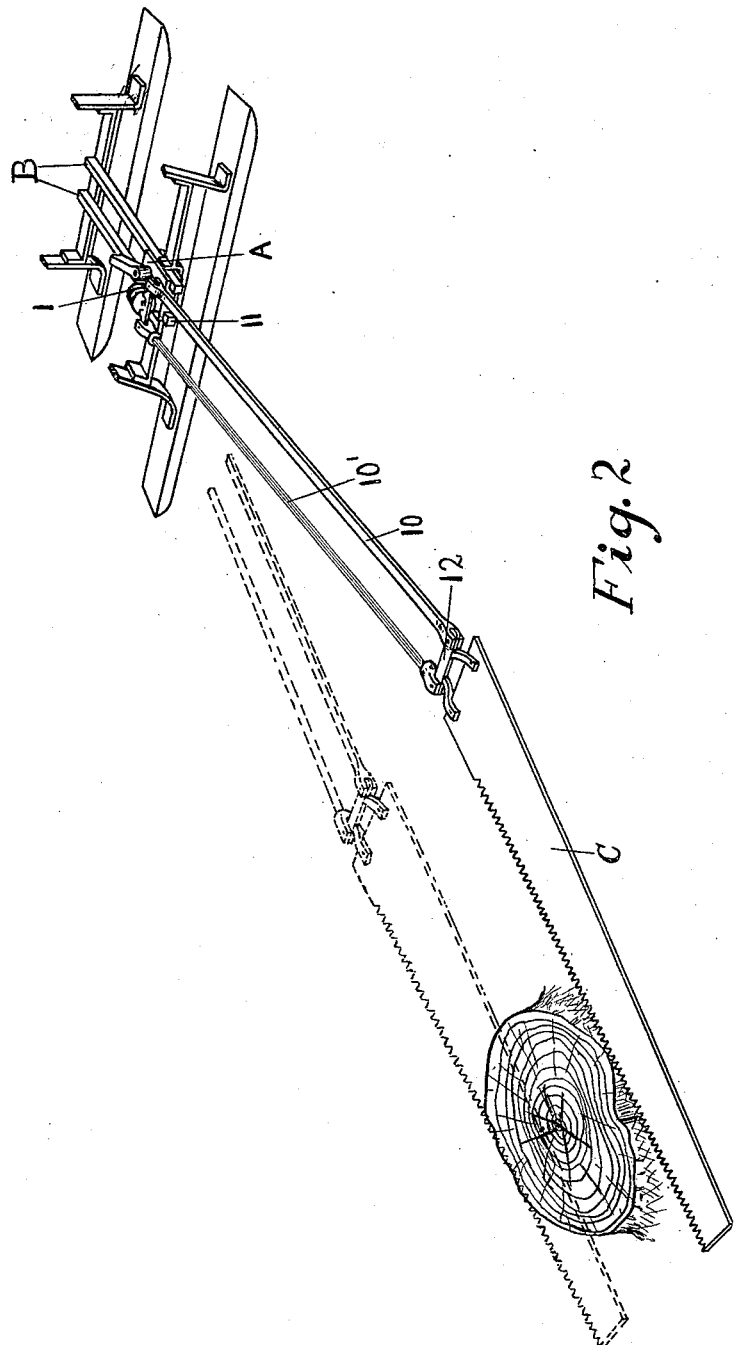

PHILIP R. KRAMER, OF BAY CITY, MICHIGAN, ASSIGNOR TO EDWARD C. EWEN, OF SAGINAW, MICHIGAN.

SAW-BAR FOR MOTOR-DRIVEN SAWING-MACHINES.

951,282.   Specification of Letters Patent.   Patented Mar. 8, 1910.

Application filed March 8, 1909. Serial No. 481,949.

*To all whom it may concern:*

Be it known that I, PHILIP R. KRAMER, a citizen of the United States, residing at Bay City, in the county of Bay and State of Michigan, have invented certain new and useful Improvements in Saw-Bars for Motor-Driven Sawing-Machines; and I do hereby declare the following to be a full, clear, and exact description of the invention, such as will enable others skilled in the art to which it appertains to make and use the same.

My invention relates to power driven sawing machines and more particularly to the connection between the cross-head and the saw.

It must be remembered that varying conditions are met with in the practical operation of machines of this class. For instance, it may be necessary for the machine to rest on an incline as a hill side, for instance, in felling trees, or it may be necessary that the machine rest on a horizontal plane above or below the felled log in sawing such log into sections. Even when a suitable support for the machine was provided, the feed of the saw to the work heretofore is inefficient, especially in cutting a felled log into sections, owing to the incline to the horizontal at which the saw works. The result is that, because the body of the machine is of necessity stationary relative to the log, the saw is given a rocking, swinging or fiddling action relative to the log and the maximum effective cut is not obtained because successive teeth are brought singly into engagement with the work, instead of all the teeth throughout the diameter of the work.

One object of my invention is the provision of a machine suitable for all conditions of work.

Another object is the provision of a machine wherein the "rock" or fiddling action of the saw is eliminated.

A further object is the provision of a machine wherein the cutting teeth are maintained in engagement with the work throughout the length of cut, to obtain the maximum efficiency.

Still another object is the provision of a saw, the cutting edge of which will reciprocate on a plane parallel with the slides on which the driving cross-head runs in cutting felled logs and will maintain such position throughout the entire operation as it is fed vertically, either upward, downward or on a slant.

A still further object is the provision of a saw which can be arranged to cut through a tree to be felled or through a felled tree at any desired angle.

To attain these ends, I provide a saw-bar in which my invention results. This saw-bar is adapted to maintain the cutting line of the saw parallel to the direction of motion of the cross-head at all times.

I further provide an adjustable saw-bar, whereby the plane of the saw may be adjusted to any angle throughout an entire circle.

To the foregoing and other ends, my invention consists in certain novel features and constructions such as will be more fully described hereinafter and particularly pointed out in the claims.

In the accompanying drawings, Figure 1 is a side view of my invention, showing its position primarily with reference to a felled tree or log, dotted lines showing its final position. Fig. 2 is a top plan view showing it in position to fell a tree, dotted lines showing its final position, and Figs. 3 and 4 are detail views of the mechanism connecting the saw-bar to the cross-head.

A indicates a cross-head reciprocating in the guides B, and actuated preferably by an engine in any convenient manner, not shown. An angular knee or standard 1 is secured to the upper surface of the cross-head, the standard being provided with an elongated bearing 2, the bore of which is recessed as at 3. The outer face of the standard is preferably dished or cupped as at 4. A disk 5 having an inverted key-hole slot 6 is received against the cupped face of the standard, a bolt 7 receivable in the bearing 2, the head of such bolt projecting beyond the cupped face a distance equal to the thickness of the disk 5 and being received in the key-hole slot. This bolt is provided with a key 8 receivable in the recess 3 to prevent rotation of the bolt relative to the standard. A nut 9 on the bolt operates to draw the head thereof tightly against the outer face of the disk to crowd the disk snugly against the cupped face of the standard. The above described arrangement is one of many which might be utilized for permitting a rotative adjustment of the disk relative to the standard, and any desired angle of adjustment throughout the 360 degrees may be obtained.

My improved means for connecting the saw C to the cross-head consists broadly in the provision of a pair of parallel rods 10, 10' pivotally connected with the cross-head and with the saw respectively, and operating to maintain the cutting edge of the saw parallel or in alinement with the direction of motion of the cross-head at all times. By this connection, all rocking of the saw is eliminated, the saw may be elevated above or depressed below the horizontal plane of movement of the cross-head and the line of the cutting edge of the saw is maintained horizontal. In the present instance, the outer face of the disk is provided with a preferably diametrically extending bar 11, extending at right angles thereto, a yoke 12 being connected in any suitable manner to the saw. The bar and yoke are maintained in parallelism with each other by means of the parallel rods 10, 10' pivotally connected at opposite ends to the respective opposite ends of the bar and yoke respectively. One or both of the rods may be solid and rectangular in form as shown, to afford sufficient strength and rigidity to the structure.

In my invention, parallel rod connecting bars of varying lengths may be employed, it being necessary merely to slack off the nut 9 to loosen the clamping action of the head of the bolt 7 on the outer face of the disk 5, after which the disk and its connected parts may be disengaged from the bolt because of the key-hole slot, and another connecting bar substituted therefor. By reason of the parallel rod connection, the cutting edge of the saw is maintained parallel or in alinement with the horizontal plane of reciprocation of the cross-head, either above or below. Also, the direction of motion of the saw will remain parallel or in alinement with the direction of motion of the cross-head during the cutting operation, whether the saw is cutting horizontally, vertically or at any angle of 360°.

Changes might be made in the form and arrangement of the various parts described without departing from the spirit and scope of my invention.

Having thus fully disclosed my invention, what I claim as new, is:—

1. In a drag saw for cutting felled trees, the combination with a reciprocating drive and a saw, of a parallel linkage pivotally connected to and extending between the saw and drive respectively to maintain all the teeth of the saw throughout the length of the cut in engagement with the work at all times.

2. The combination in a saw machine, with a reciprocating cross-head and a saw, of a saw bar comprising parallel rods pivotally connected to the cross-head and to the saw respectively.

3. In a saw machine, the combination with a cross-head, a saw, and a yoke secured to the saw, of a bar carried by the cross-head, and parallel rods pivotally connecting the yoke and the bar.

4. In a saw machine, the combination with a cross-head, of a member adjustable rotatably relative to the cross-head, a yoke, a saw to which the yoke is secured, and parallel rods connecting the member and yoke.

5. In a saw machine, the combination with a cross-head and a saw, of a support on the cross-head, the support having a fastening means projecting therefrom, a disk having a perforation therein for receiving the fastening means, the disk capable of rotative adjustment relative to the support, a bar carried by the disk, a yoke secured to the saw, and parallel rods pivotally connected to the bar and the yoke respectively.

6. In a saw machine, the combination with a saw and a reciprocating cross-head, of a standard secured to the cross-head, the standard having a centrally apertured dished face and an elongated bearing projecting rearwardly from the aperture, the bearing having a recess formed therein, a headed bolt receivable in the bearing, a key carried by the bolt and receivable in the recess to prevent rotation of the bolt, a disk having a key-hole slot and adjustable rotatively relative to the standard, and means connecting the saw and the disk.

7. A saw machine comprising a saw, a reciprocating cross-head, a standard on the cross-head, a fastening member projecting from one face of the standard, an apertured disk through which the fastening member is received, means for adjustably holding the disk in contact with the standard, and parallel rods pivotally connected with the disk and saw respectively.

In testimony whereof, I affix my signature in presence of two witnesses.

PHILIP R. KRAMER.

Witnesses:
E. I. PARADIS,
S. L. JENKINS.